US007047008B2

(12) United States Patent
Martlew

(10) Patent No.: US 7,047,008 B2
(45) Date of Patent: May 16, 2006

(54) SYSTEM FOR MOBILE RADIO COMMUNICATION AND A METHOD RELATING TO SERVICE PROVISION IN MOBILE RADIO COMMUNICATION NETWORKS

(75) Inventor: Paul Martlew, Surrey (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/480,814

(22) PCT Filed: Jun. 5, 2002

(86) PCT No.: PCT/SE02/01075

§ 371 (c)(1),
(2), (4) Date: Jul. 8, 2004

(87) PCT Pub. No.: WO02/104062

PCT Pub. Date: Dec. 27, 2002

(65) Prior Publication Data

US 2004/0235476 A1 Nov. 25, 2004

(30) Foreign Application Priority Data

Jun. 15, 2001 (SE) .................................. 0102136

(51) Int. Cl.
H04Q 7/20 (2006.01)
(52) U.S. Cl. ................. 455/435.2; 455/432.1; 455/433; 455/435.1; 455/552.1
(58) Field of Classification Search ................ 455/418, 455/419, 422.1, 432.1, 432.3, 433, 434, 435.1, 455/435.2, 525, 550.1, 552.1
See application file for complete search history.

(56) References Cited

U.S. PATENT DOCUMENTS

| 5,159,625 | A | * | 10/1992 | Zicker ..................... 455/432.1 |
| 5,442,806 | A | | 8/1995 | Barber et al. |
| 5,590,397 | A | * | 12/1996 | Kojima ....................... 455/417 |
| 5,761,618 | A | * | 6/1998 | Lynch et al. ................ 455/419 |
| 5,787,347 | A | * | 7/1998 | Yu et al. ..................... 455/440 |
| 5,873,034 | A | * | 2/1999 | Alperovich et al. ...... 455/432.3 |
| 5,903,832 | A | * | 5/1999 | Seppanen et al. ........ 455/435.3 |
| 5,950,130 | A | * | 9/1999 | Coursey .................. 455/432.1 |
| 5,974,315 | A | * | 10/1999 | Hudson ..................... 455/427 |
| 5,983,115 | A | | 11/1999 | Mizikovsky |
| 5,999,811 | A | * | 12/1999 | Molne ..................... 455/432.3 |
| 6,128,489 | A | * | 10/2000 | Seazholtz et al. ........ 455/432.1 |

(Continued)

FOREIGN PATENT DOCUMENTS

FR    2 802 379    6/2001

(Continued)

Primary Examiner—William Trost
Assistant Examiner—James D. Ewart
(74) Attorney, Agent, or Firm—Nixon & Vanderhye, P.C.

(57) ABSTRACT

The present invention relates generally to a method and apparatus for selecting a visited mobile radio network upon international roaming. More particularly, the invention relates to selecting a mobile radio network with regard to the support given by the mobile radio network in respect of a network feature. An international roaming indication is provided to the home mobile radio network of a mobile station, indicating that the mobile station is roaming, or is intending to roam, internationally. Such international roaming indication comprises information about geographic region(s) in which it is likely that the mobile station will communicate. The home mobile radio network then selects at least one mobile radio network, operated in the geographic region(s) and supporting the network feature needs of the mobile station, and sends information to the mobile station regarding the selected mobile radio network(s).

19 Claims, 7 Drawing Sheets

U.S. PATENT DOCUMENTS

| | | | |
|---|---|---|---|
| 6,148,197 A | 11/2000 | Bridges et al. | |
| 6,195,532 B1 * | 2/2001 | Bamburak et al. | 340/7.42 |
| 6,201,964 B1 | 3/2001 | Tung et al. | |
| 6,259,914 B1 * | 7/2001 | Koster | 455/432.1 |
| 6,463,286 B1 * | 10/2002 | Salminen | 455/453 |
| 6,564,055 B1 * | 5/2003 | Hronek | 455/433 |
| 6,615,041 B1 * | 9/2003 | Adamany et al. | 455/432.1 |
| 6,625,451 B1 * | 9/2003 | La Medica et al. | 455/434 |
| 6,643,511 B1 * | 11/2003 | Rune et al. | 455/433 |
| 6,751,472 B1 * | 6/2004 | Muhonen | 455/553.1 |
| 2002/0168976 A1 * | 11/2002 | Krishnan | 455/432 |

FOREIGN PATENT DOCUMENTS

| | | |
|---|---|---|
| WO | 98/11754 | 3/1998 |
| WO | 00/62560 | 10/2000 |

\* cited by examiner

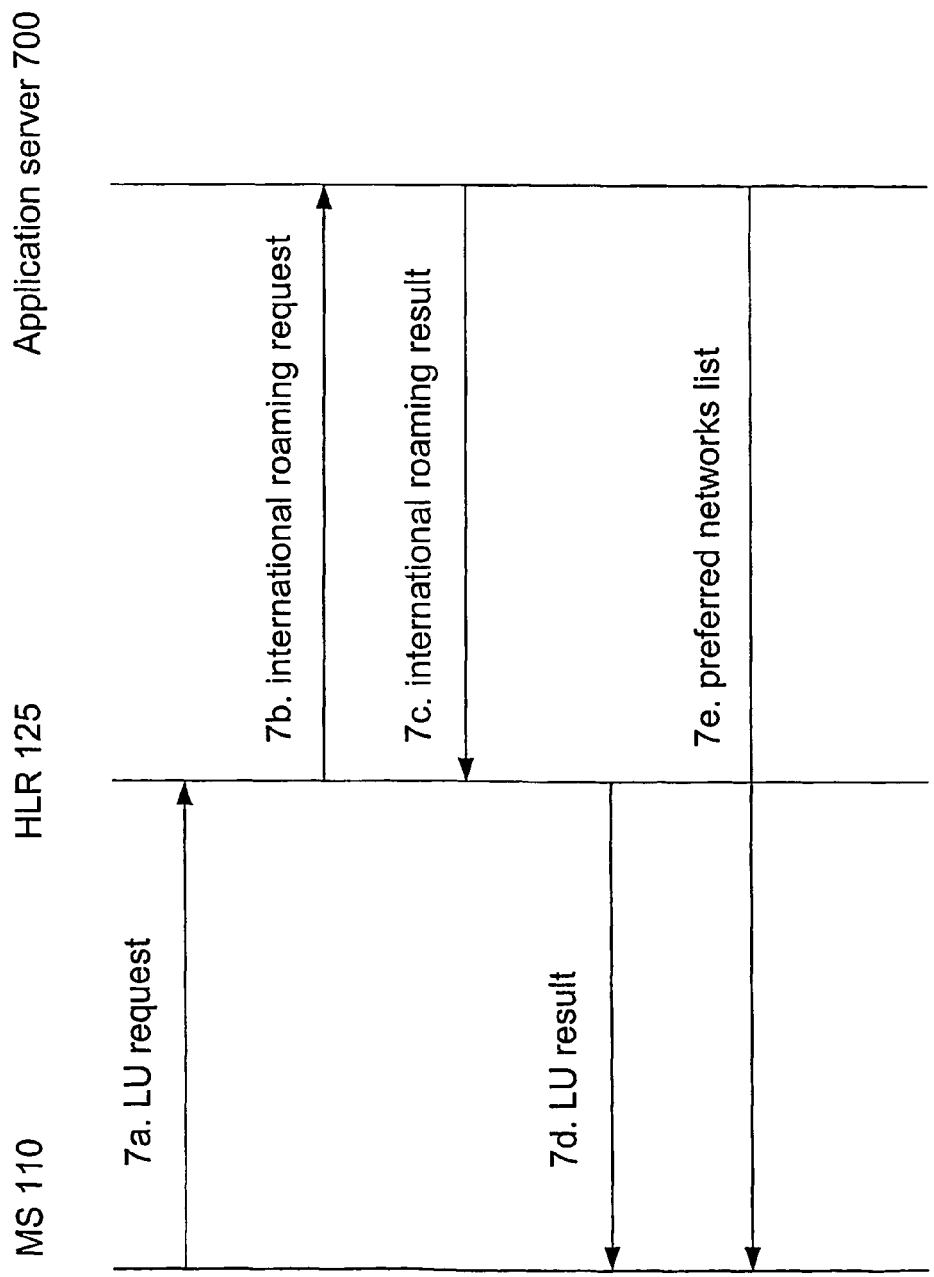

US 7,047,008 B2

SYSTEM FOR MOBILE RADIO COMMUNICATION AND A METHOD RELATING TO SERVICE PROVISION IN MOBILE RADIO COMMUNICATION NETWORKS

This application is the US national phase of international application PCT/SE02/01075, filed in English on 5 Jun. 2002, which designated the US. PCT/SE02/01075 claims priority to SE Application No. 0102136-9 filed 15 Jun. 2001. The entire contents of these applications are incorporated herein by reference.

FIELD OF THE INVENTION

The present invention relates generally to the field of mobile radio communications, and more particularly to a method and apparatus for selecting a visited mobile radio network upon international roaming.

BACKGROUND

A subscriber to services in a mobile radio network can benefit from a large number of different services provided by the mobile radio network. Besides basic bearer services such as speech and data calls, most mobile radio networks also provide supplementary services such as call forwarding, virtual private networks, pre-paid etc. In most standards for mobile radio communication, some of these supplementary services are standardised and hence provided by all mobile radio networks based on the same standard. However, many supplementary services are also specific to a certain mobile radio network, and do not exist in other mobile radio networks based on the same standard. If no special action is taken, a subscriber to such a network-specific supplementary service will therefore not be able to use the service when he leaves his home mobile radio network.

In the standards of Global System for Mobile communications (GSM) and Universal Mobile Telephony System (UMTS) a network feature has been implemented to address this problem. This network feature is referred to as Customized Application for Mobile network Enhanced Logic (CAMEL), and introduces a possibility for the mobile radio networks involved in a call to/from a roaming subscriber to exchange information about the services to which the roaming subscriber subscribes. CAMEL is described in the GSM Technical Specifications 02.78, 03.78, 09.02, and 09.78 as well as in the 3rd Generation Partnership Project Technical Specifications 22.078, 23.078, 29.002 and 29.078.

An apparatus comprising a database, a generator and a data providing device wherein the generator generates a list of preferred wireless carrier identities based upon a selected class of service, predetermined national accounts and predetermined home market areas is disclosed in U.S. Pat. No. 6,148,197.

SUMMARY

A problem to which an aspect of the present invention relates is how to enable improved service for a subscriber to services in a mobile radio network when the subscriber performs international roaming.

This problem is addressed by a method for selecting a visited mobile radio network for a mobile station performing international roaming, the mobile station being associated with a subscription to services in a home mobile radio network. The method is characterised in that the need of a network feature of the subscription is considered in selecting the visited mobile radio network.

The problem is further addressed by a system for mobile radio communication comprising mobile radio networks, each mobile radio network enabling mobile radio communication for mobile stations registered with the mobile radio network. The system is characterised by means for taking into account the needs of a network feature of a mobile station when selecting a visited mobile radio network for said mobile station.

By the inventive method and system is achieved that a user of a mobile station will experience improved support for network features, to which the user subscribes, when performing international roaming.

In one embodiment of the inventive method, a list of preferred networks, comprising the identity of at least one network which supports said need of a network feature of the subscription, is compiled. The list of preferred networks is then sent to and stored at the mobile station. In the inventive system, the means for taking into account could further comprise means for compiling a list of preferred mobile radio networks, containing identities of mobile radio networks which gives support for the network feature needs of said mobile station, and sending means for sending the list of preferred mobile radio networks to the mobile station.

Hereby is achieved that the list of preferred networks stored in the mobile station comprises identities of mobile radio networks which support the network feature needs of the mobile station. Upon failure to register with the home mobile radio network, the mobile station can select a mobile radio network from said list of preferred mobile radio networks as the visited mobile radio network with which the mobile station should try to register. In this embodiment, the identities of the preferred mobile radio networks can be placed in order of preference according to a predefined criterion.

In one embodiment of the invention, the inventive method comprises the step of receiving, in the home mobile radio network, an international roaming indication associated with the subscription. The international roaming indication comprises information on geographical region(s). The geographical region(s) are then considered, together with the network feature needs of the mobile station, in selecting the visited mobile radio network. In the inventive system, the means for taking into account could further comprise receiving means for receiving an international roaming indication associated with said mobile station, said international roaming indication comprising information on geographical region(s).

Hereby is achieved that the mobile radio network selected as the visited mobile radio network is operated in the area where the mobile station is located. In one aspect of this embodiment, the international roaming indication is a location update request comprising an identity of the mobile station, the identity of the mobile radio network to which the mobile station is trying to register and a not preferred indicator. The information on geographic region(s) consists of the identity of the mobile radio network to which the mobile station is trying to register. In this aspect, the receiving means could comprise means for receiving a location update request containing a not preferred indicator. Hereby is achieved that the sending of the international roaming indication is automatic. In this aspect, the identity of a selected visited mobile radio network can be included in a location update result message, sent to the mobile station in response to receiving said location update request.

In one embodiment of the inventive method, a set of mobile radio networks, out of which the visited mobile radio network can be selected, is arranged in an array. Each array entry represents a geographic area and each mobile radio network in the set is associated with at least one array entry representing a geographic area in which the mobile radio network is operated. Each mobile radio network in the set is further associated with information on the network feature support provided by the mobile radio network. In the inventive system, the means for taking into account could further comprise a first storage for storing information on which (if any) level(s) of capability of said network feature that each of the mobile radio networks in a set of mobile radio networks supports and a second storage for storing information on level-of-capability needs of a subscription, associated with said mobile station, with regard to said network feature.

Hereby is achieved that the finding of a visited network, which supports the network feature needs of the mobile station and is operated in the geographic area where the mobile station is located, is facilitated. In one aspect of this embodiment, the geographic area represented by an array entry corresponds to the coverage area of a mobile radio network, which is not necessarily included in the set of mobile radio networks. The coverage area of each of the mobile radio networks in the set should preferably be represented by an entry in the array in this aspect of the embodiment. In another aspect of this embodiment, the mobile radio networks in the array are placed in order of preference according to a predefined criteria. In a third aspect of this embodiment, there is associated an indicator to each mobile radio network in the set, indicating whether the mobile radio network is a favourable mobile radio network. The value of this indicator is then taken into account in selecting a visited mobile radio network. Hereby is achieved that e.g. the operator of the home mobile radio network can point out the mobile radio networks which the operator for some reasons finds more suitable for subscribers in the home mobile radio network.

The problem addressed by this invention is further met by a mobile station for communicating in a mobile radio system. The mobile station is associated with a subscription to services in a home mobile radio network and comprises a storage for storing a list of preferred mobile radio networks. The mobile station is capable of sending a location update request comprising a not preferred indicator to the home mobile radio network when trying to register with a mobile radio network other than the home mobile radio network or the mobile radio networks listed in the list of preferred mobile radio networks.

BRIEF DESCRIPTION OF THE DRAWINGS

The present invention will now be discussed in more detail with reference to preferred embodiments of the present invention, given only by way of example, and illustrated in the accompanying drawings, in which:

FIG. 7 is an exemplary signalling diagram describing the flow of messages when the international roaming indication is included in the location update request.

DETAILED DESCRIPTION

Figure 1:
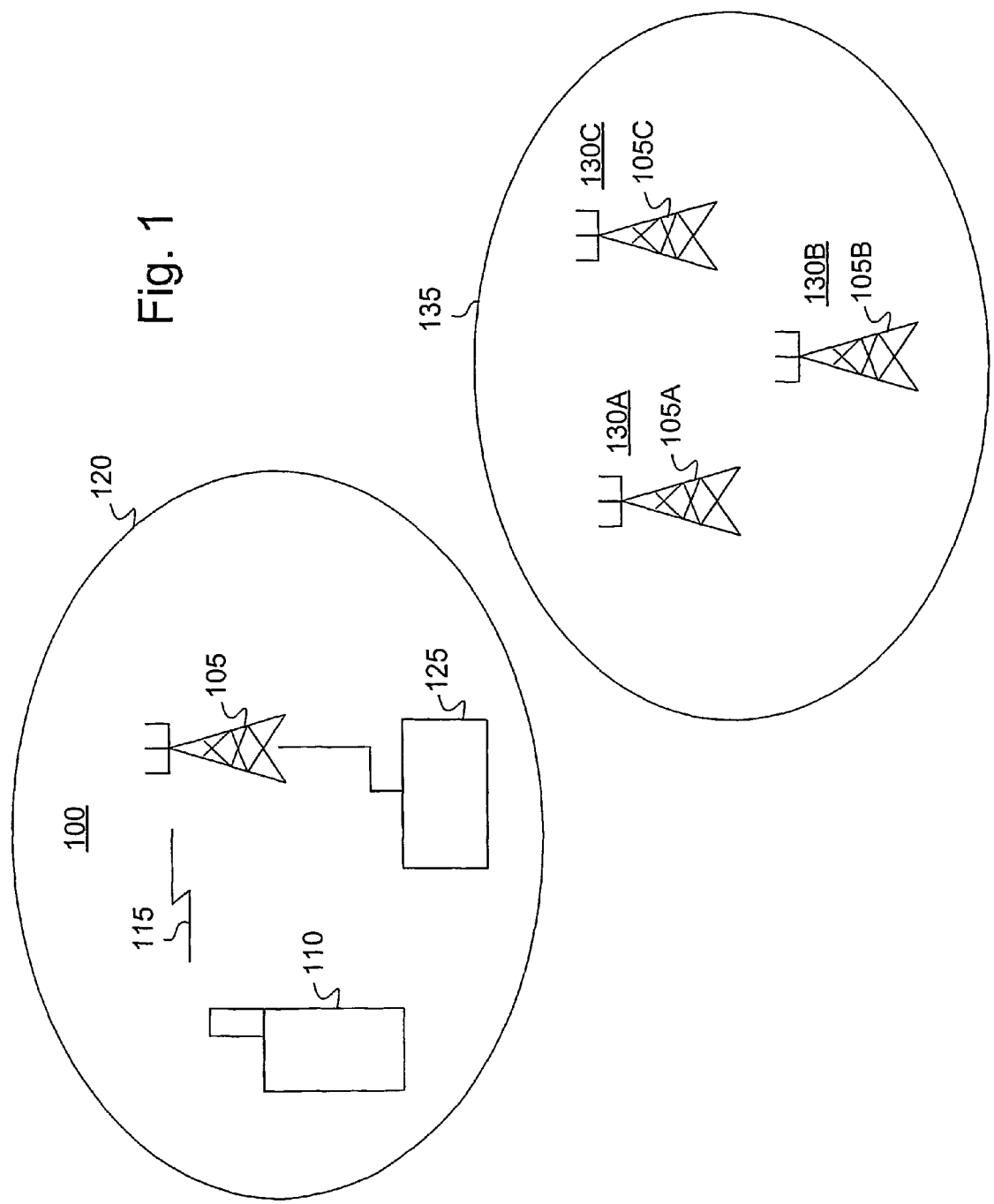
FIG. 1 schematically illustrates a mobile station communicating in its home mobile radio network, the network being operated in a home network area. Also shown is a geographic area not covered by the home mobile radio network, in which three different mobile radio networks are operated.

An exemplary mobile radio network 100, or simply network 100, is schematically illustrated in FIG. 1. Network 100 comprises at least one radio base station 105 and provides mobile radio communication to users of Mobile Stations (MSs) within a limited geographic area, often bounded by international borders. An exemplary MS 110, associated with a subscription to services provided by network 100, is shown communicating via signalling link 115 in FIG. 1. The term mobile station includes any terminal or network offering packet- or circuit-related connectivity in network 100. The exemplary network 100 in FIG. 1 is shown to be a GSM network, but the present invention could be applied to networks 100 of any standard.

Network 100 is the home mobile radio network of MS 110, and network 100 will hereinafter be referred to as home network 100. The geographic area to which home network 100 is limited will be referred to as the home network area 120. As long as MS 110 stays within the home network area 120, home network 100 will provide MS 110 with the services to which the user of MS 110 is subscribing. These services could e.g. be bearer services such as speech or data, as well as supplementary services such as pre-paid or call forwarding.

Home network 100 further comprises a Home Location Register (HLR) 125, in which information on all subscribers to services in home network 100 are stored. Such subscriber information could e.g. be identity (such as phone-number) and subscribed services.

When MS 110 leaves home network area 120 to enter another geographic area, MS 110 performs what will hereinafter be referred to as international roaming. MS 110 can then no longer benefit from the bearer services provided by home network 100. However, outside of home network area 120, there are several other mobile radio networks, hereinafter referred to as networks 130, providing services to MSs. In FIG. 1, a geographic area 135 is shown, in which three networks 130A, 130B and 130C are operated, each represented by a radio base station 105A, 105B and 105C, respectively. MS 110 could therefore, by registering with one of networks 130A, 130B or 130C, still use mobile services in geographic area 135. A network 130 with which MS 110 registers when entering a geographic area not covered by the home network 100 will in the following be referred to as a visited network.

A list is stored in MS 110, listing some networks 130 in which subscribers in home network 100 are allowed to communicate according to roaming agreements between home network 100 and the networks 130 in the list. This list will in the following be referred to as the preferred networks list. Since the number of networks 130, with which home network 100 has roaming agreements, is typically large compared to the number of entries reserved for networks 130 in the preferred networks list, there most likely exist other networks 130, not listed in the preferred networks list, in which subscribers in home network 100 are also allowed to communicate.

In following the existing procedure for selecting a visited network when entering a geographic area 135, MS 110 selects the first network 130 in the preferred networks list and tries to register with this selected network. If the selected network is any of networks 130A, 130B or 130C, this registration trial will probably be successful, depending e.g. on present load in the selected network. However, if the selected network is not any of networks 130A, 130B or 130C, then the registration trial will fail. MS 110 will then try to register with the next network 130 in the preferred networks list. If MS 110 is not successful in registering with any of the networks 130 in the preferred networks list, then MS 110 will check the signal strengths perceived from the surrounding networks 130. In a mobile radio system operating according to the GSM standard, the MS 110 will build a list of the networks 130 from which it can perceive a signal strength >85 dB, and try to register with the networks 130 in this list. If MS 110 is not successful in registering with any of the networks 130 in the list, e.g. because home network 100 does not have roaming agreements with the networks 130 in the list, then MS 110 builds another list of networks 130 from which it can perceive a signal strength <85 dB. MS 110 will then try to register with the networks in this other list. The existing procedure for selecting a network 130 to which MS 110 should try to register according to other standards of mobile telephony, such as e.g. the UMTS standard, are also based on measurements of the signal strength of surrounding networks 130.

Had all the networks 130 present in a geographic area 135 been identical apart from the signal strengths provided in different parts of geographic area 135, then the above described existing procedure for selecting a visited network would always have resulted in the best service available for MS 110. However, in some respects, networks 130 present in the same geographic area 135 are most likely to differ. One such respect is the version of CAMEL that has been implemented in the networks 130.

If both the visited network and the home network 100 have implemented CAMEL, a MS 110 to which a CAMEL subscription is associated will be able to benefit from services specific to home network 100. When a service specific to home network 100 is invoked, the call is switched in the visited network under the control of the home network 100, and the service specific to the home network 100 is executed in the home network 100, despite that the MS 110 is roaming elsewhere.

However, not all GSM or UMTS mobile radio networks have implemented the CAMEL feature. If a MS 110, associated with a subscription to network-specific supplementary services, performs international roaming and registers in a network 130 which does not support CAMEL, the network-specific supplementary services will not work at all. This can be a very severe problem to the user of MS 110. If, e.g., the subscription is part of a Virtual Private Network (VPN) with calls outside the VPN barred, and the VPN has been implemented as a network-specific supplementary service which relies on CAMEL, the user of MS 110 will not be able to use the MS 110 for any calls but emergency calls in a network 130 that does not support CAMEL.

Although many networks 130 have implemented CAMEL, the CAMEL feature is evolving and different phases of the feature have been released by the standardisation fora. Hence, different phases of the feature have been implemented in different networks 130. Each phase of CAMEL has different capabilities and possibilities to support network-specific supplementary services. Thus, when a MS 110 roams in a network 130 which has implemented a less elaborated phase of CAMEL than the home network 100, it is likely that the network-specific supplementary services to which the user of MS 110 subscribes will not function the way the user expects them to.

Since no selectivity with regard to CAMEL capabilities, or any other network features, is introduced in the above described existing procedure for selecting a visited network, MS 110 may end up registering with a visited network which does not at all support the needs of the network feature that the MS 110 has, even in situations when there exist network(s) in the geographic area 135, in which MS 110 is roaming, that does support the needs of MS 110 and in which subscribers in home network 100 by a roaming agreement are allowed to communicate.

In the inventive method for selecting a visited network for a MS 110, an international roaming indication is provided to the home network 100, indicating that MS 110 is roaming, or is intending to roam, internationally. Such international roaming indication comprises information about geographic region in which it is likely that MS 110 will communicate. The international roaming indication could then be processed by the home network 100, and a new preferred networks list could be compiled and downloaded to MS 110, the new preferred networks list comprising networks 130 providing services in the geographic region indicated in the international roaming indication. If MS 110 is then unsuccessful in registering with home network 100, MS 110 tries to register with the first network 130 in the new preferred networks list. If this registration trial is not successful, MS 110 tries to register with the next network 130 in the new preferred networks list. If MS 110 is not successful in registering with any of the networks 130 listed in the new preferred networks list, then MS 110 tries to register with one of the networks 130 from which MS 110 can perceive a radio signal.

The new preferred networks list could be tailor-made to suit the needs of MS 110 as well as the objectives of the operator of home network 100. When compiling the new preferred networks list, the home network 100 could e.g. choose to put networks 130 at the top of the list which home network 100 has an owner's interest in, or with which home network 100 has favourable agreements.

The international roaming indication could be provided to the home network 100 e.g. by the user of MS 110 giving a phone-call to a customer care operator, or sending information via a network service such as e.g. the Wireless Application Protocol (WAP), the World Wide Web (WWW), the Short Message Service (SMS) or an Intelligent Network (IN) service. In case of the international roaming indication being sent to the home network 100 via a network service, the international roaming indication could preferably comprise entries, each entry representing a geographic region.

The international roaming indication could alternatively be included in the location update request sent from the MS 110. The sending of the international roaming indication would then be automatic. The MS 110 could e.g. include a parameter in the location update request, indicating that the network 130, with which the MS 110 is presently trying to register, is not one of the networks 130 included in the preferred networks list, stored in the MS 110. Such parameter will in the following be referred to as the not preferred indicator. Since a location update request includes the identity of the mobile radio network 130 with which the MS is trying to register, the identity of the mobile radio network 130 could be used to identify the geographic area in which the MS 110 is presently active. A location update request also includes more detailed information on the location of the MS 110, which could be used to identify adjacent geographic areas which could possibly be of interest to MS 110. For details on location updating, see e.g. GSM Technical Specification 09.02.

The international roaming indication could be processed by the HLR 125, or by any other node(s) connected to home network 100. Alternatively, parts or all of the processing of the international roaming indication could be performed by a human being. The preferred networks list could be sent to MS 110 by use of SMS, or any other network service which allows the home network 100 to download information to MS 110. In case of the international roaming indication being included in location update request, a preferred networks list could be included in the location update result message sent from the network to the MS 110. The preferred networks list could then be stored in MS 110. In GSM, the preferred networks list could e.g. be stored in the MS 110 by use of an existing toolkit referred to as the SIM (Subscriber Identity Module) application toolkit.

Figure 2:
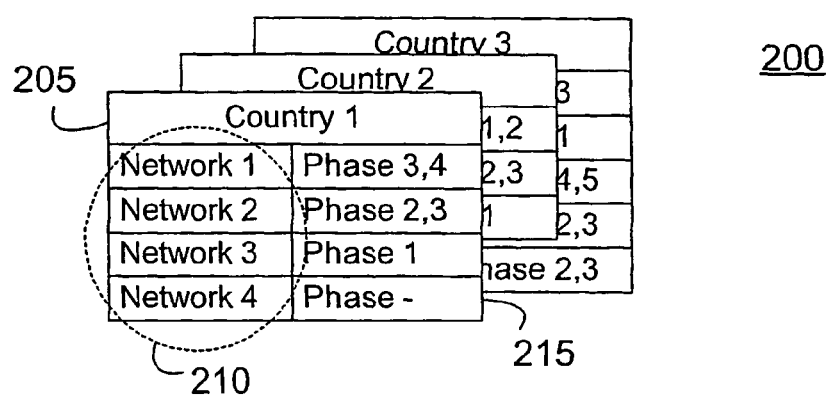
FIG. 2 is an example of a country array which could be used when compiling a preferred networks list.

In order to facilitate for the selection of networks 130 to be entered in the preferred networks list, an array could be kept at a node in the home network 100, such as e.g. the HLR 125, or at any other node connected to the home network 100. The array could comprise networks 130 with which home network 100 has a roaming agreement, the networks 130 in the array being arranged e.g. according to in which geographic area(s) networks 130 are operated. An example of such an array of geographic areas is shown in FIG. 2, in which the geographic areas are referred to as countries. It should be understood that the term "country" does not here necessarily mean "country" in the political sense, but could e.g. refer to a geographic region in which the available radio frequencies are administered by the same authority. Shown in FIG. 2 is country array 200, into which three country entries 205, each representing a country, have been entered. To each country entry 205 is linked a networks list 210, listing identities of the networks 130 present in the country associated with country entry 205 and with which home network 100 has a roaming agreement. To each entry in the networks list 210 is linked a capabilities list 215, listing the phases, or levels of capabilities, of a network feature supported by the network 130 associated with that entry. The entries in each network list 210 could be arranged so that the identity of the network 130, which the home network 100 according to some criterion (or criteria) finds to be the preferred network 130, is at the top of the network list 210, the identity of the second best network 130 at the second position in the network list 210 etc. The criterion could e.g. be the level of radio coverage of the networks 130, ownership of the networks 130, or any other criterion.

Figure 3:
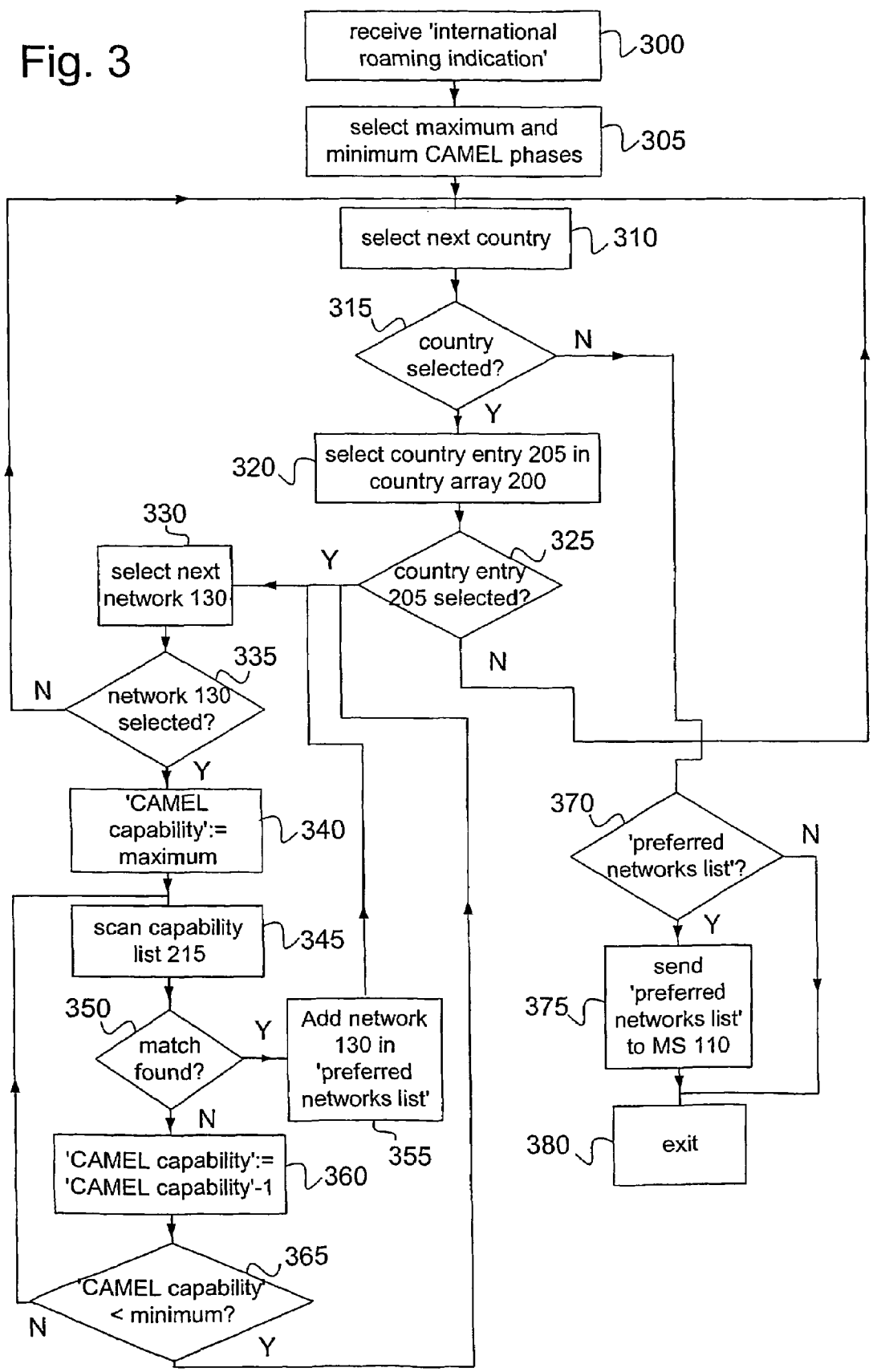
FIG. 3 schematically illustrates a flowchart describing one embodiment of the inventive method.

In FIG. 3, a flowchart describing an example of the method of the invention is presented.

The example of FIG. 3 is, for the purpose of illustration, presented in relation to the network feature known as CAMEL. The inventive method could, however, be applied in relation to any network feature, such as e.g. the General Packet Radio Service (GPRS). In step 300, an international roaming indication is received by the home network 100 from the user of MS 110, or from MS 110. The international roaming indication comprises entri(es), each entry corresponding to a country. The international roaming indication could be transferred to home network 100 by the user of MS 110 giving a phone-call to a customer care operator, or sending information via a network service such as e.g. the Wireless Application Protocol (WAP), the World Wide Web (WWW), the Short Message Service (SMS) or an Intelligent Network (IN) service. Alternatively, the international roaming indication could be included in a location update request.

The international roaming indication is then processed by home network 100, e.g. in HLR 125. In step 305, the specific CAMEL needs of MS 110 stored in the HLR 125 are checked, and the maximum (most elaborated) and minimum (least elaborated) levels of capability of CAMEL that would satisfy the network feature capabilities needs of MS 110 are selected. Step 310 is then entered, in which the first country in the international roaming indication is selected. In step 315 it is checked whether the country selection in step 310 was successful. If not, then step 370 is entered where it is checked whether a preferred networks list has been compiled. Since no preferred networks list has been compiled in the case where no country at all was found in the international roaming indication, step 380 is entered where the procedure is exited. However, if the outcome of the check in step 315 is that a country was successfully selected in step 310, then step 320 is entered. In step 320, the country array 200 is scanned in order to look for a country entry 205, matching the country selected in step 310, to select. In step 325, it is checked whether a country entry 205 has been selected in step 320. If not, then step 310 is re-entered where the next country in the international roaming indication is selected. However, if a matching country entry 205 was successfully selected, then step 330 is entered. In step 330, the first network 130 in the networks list 210 linked to the country entry 205 is selected. In step 335, it is checked whether a network 130 was successfully selected in the network selection of step 330. If so, then step 340 is entered. A CAMEL-capability parameter, representing a level of capability of CAMEL which would give satisfying CAMEL support to MS 110, is here set to the value of the maximum CAMEL level of capability selected in step 305. Step 345 is then entered, where capabilities list 215, associated with the network 130 selected in step 330, is scanned for a match to the value of the CAMEL-capability parameter. In step 350, it is checked whether a match was found. If a match was found, the identity of network 130 selected in step 330 is entered into a preferred networks list in step 355. Step 330 is then re-entered, where the next network 130 in network list 210, associated with the country entry 205 selected in step 320, is selected. However, if it is found in step 350 that the network selected in step 330 does not support the CAMEL level of capability represented by the CAMEL-capability parameter, then step 360 is entered, where the value of the CAMEL-capability parameter is altered in order to represent the CAMEL level of capability next in elaboration to that previously represented by the CAMEL-capability parameter. In step 365, it is checked whether the CAMEL level of capability represented by the CAMEL-capability parameter is less elaborated than the minimum CAMEL level of capability selected in step 305. If so, then step 330 is re-entered where the next network 130 is selected from the network list 210 associated with the country entry 205 selected in step 320. If not, then step 345 is re-entered.

If it is found in step 335 that no network 130 was successfully selected in step 330, then step 310 is re-entered, where the next country in the international roaming indication is selected. If it is then found in step 315 that no country was successfully selected in step 310, then step 370 is entered. If there are entries in the preferred networks list, entered in step 355 described above, then the preferred networks list is sent to MS 110 in step 375. The exit-step 380 is entered. If there are no entries in the preferred networks list, then the exit-step 380 is entered directly.

Figure 4:
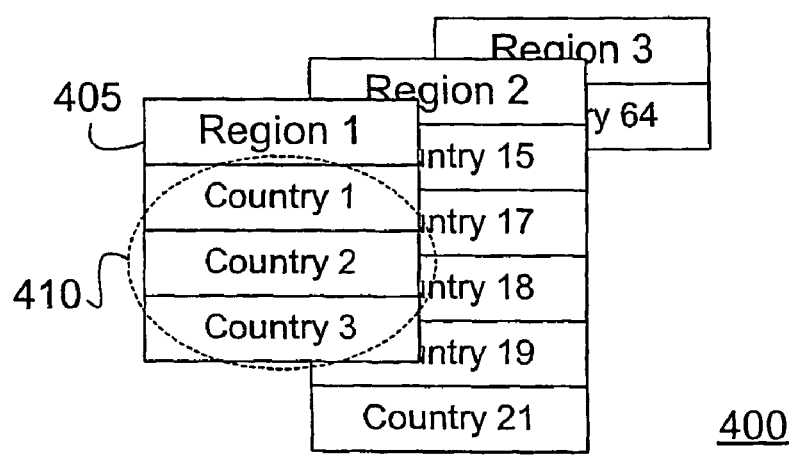
FIG. 4 is an example of a region array which could be used when compiling a preferred networks list.

In some cases it might be desirable to allow for the international roaming indication to comprise entries representing geographic areas other than countries, such as e.g. continents or provinces. The term region will in the following be used to refer to a well defined geographic area, covering either less than an entire country, one country, or more than one country. In FIG. 4, a region array 400 is shown, the region array 400 shown containing three different region entries 405, each representing a geographic region. To each region entry 405 is linked a country list 410, listing the countries or country included in the region represented by the region entry 405 to which the country list 410 is linked. When an entry in the international roaming indication has been identified as a region, then the steps 330 to 365 of FIG. 3 should be run for all entries in the countries list 410.

The array presented in FIG. 2 could e.g. be arranged as a CAMEL level of capabilities array instead of a country array, each entry in the array representing a CAMEL level of capability and having linked lists of networks supporting that CAMEL level of capability. Each network could then have a linked list of identiti(es) of the country (or countries) in which the network is operated. The flowchart of FIG. 3 would then be altered analogously. In another embodiment, all networks 130 with which the home network 100 has roaming agreements could be arranged in a network array, each entry in the network array representing a network 130 and being linked with information on geographic coverage as well as CAMEL capabilities of that network 130. The network array could then be scanned for networks 130 having the desired CAMEL capabilities as well as being operated in the geographic regions indicated in the international roaming indication.

When the international roaming indication sent to the home mobile network 100 is included in a location update request, the "country" represented by each country entry 205 could advantageously correspond to the coverage area of a network 130, since the information on geographic areas included in a location update request comprising an identification of the network 130 with which the MS 110 is presently trying to register. An example of such a country array 500 is presented in FIG. 5. In the country array 500 of FIG. 5, three different country entries 205 are shown. Advantageously, the country array 500 should comprise a country entry 205 for as many networks 130 in the world, compatible with the standard of home network 100, as possible, so that when MS 100 is trying to register with any network 130, a country entry 205 will be found corresponding to that network 130.

Figure 5:
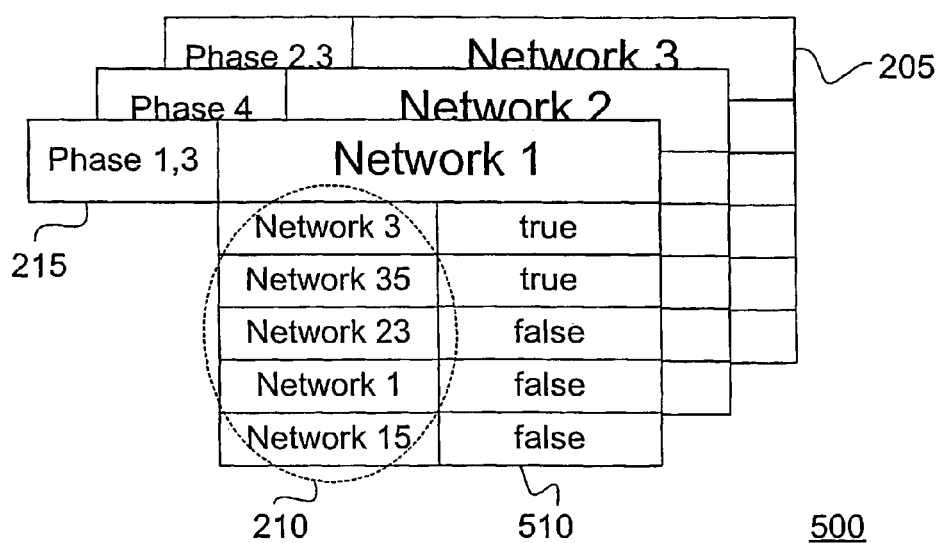
FIG. 5 is an example of a country array in which each array entry is represented by the coverage area of a mobile radio network.

To each country entry 205 of FIG. 5 is linked a networks list 210 of networks 130 with which the operator of home network 100 has roaming agreements, the networks in the networks list 210 being operated in the same (or neighbouring) geographic area as the network 130 represented by the country entry 205. To each country entry 205 is also linked a capabilities list 215, listing the phases, or levels of capabilities, of a network feature supported by the network 130 associated with that entry. As an option, a best networks indicator 510 could be linked to each entry in the networks list 210, the best networks indicator 510 indicating whether the network represented by the country entry 205 belongs to a group of networks 130 which the operator of home network 100 for some reason considers to be favourable over other networks 130. Alternatively, a best networks indicator 510 could be associated with each country entry 205. Furthermore, a capabilities list 215 could be associated with each entry in the networks lists 210 instead of with each country entry 205. If the operator of home network 100 has roaming agreements with the operator of the network 130 represented by the country entry 505 to which networks list 210 is linked, this network 130 could be included in the networks list 210 (see e.g. network 1 of FIG. 5). However, if both the capabilities list 215 and a possible best networks indicator 510 are associated with the country entry 205 rather than with the entries in networks list 210, then the country entry 205 could be checked directly.

Each entry in the networks list 210 could be linked to a country entry 205 representing the network 130 associated with the entry in networks list 210. When a location update request, comprising a non preferred indicator, is received by the home network 100 in which a country array 500 is stored, the country entry 205 corresponding to the network identity included in the location update request is selected. The networks list 210 linked to country entry 205 is entered, and for each entry in networks list 210, the country entry 205 linked to the networks list entry is checked for network feature capabilities.

Figure 6:
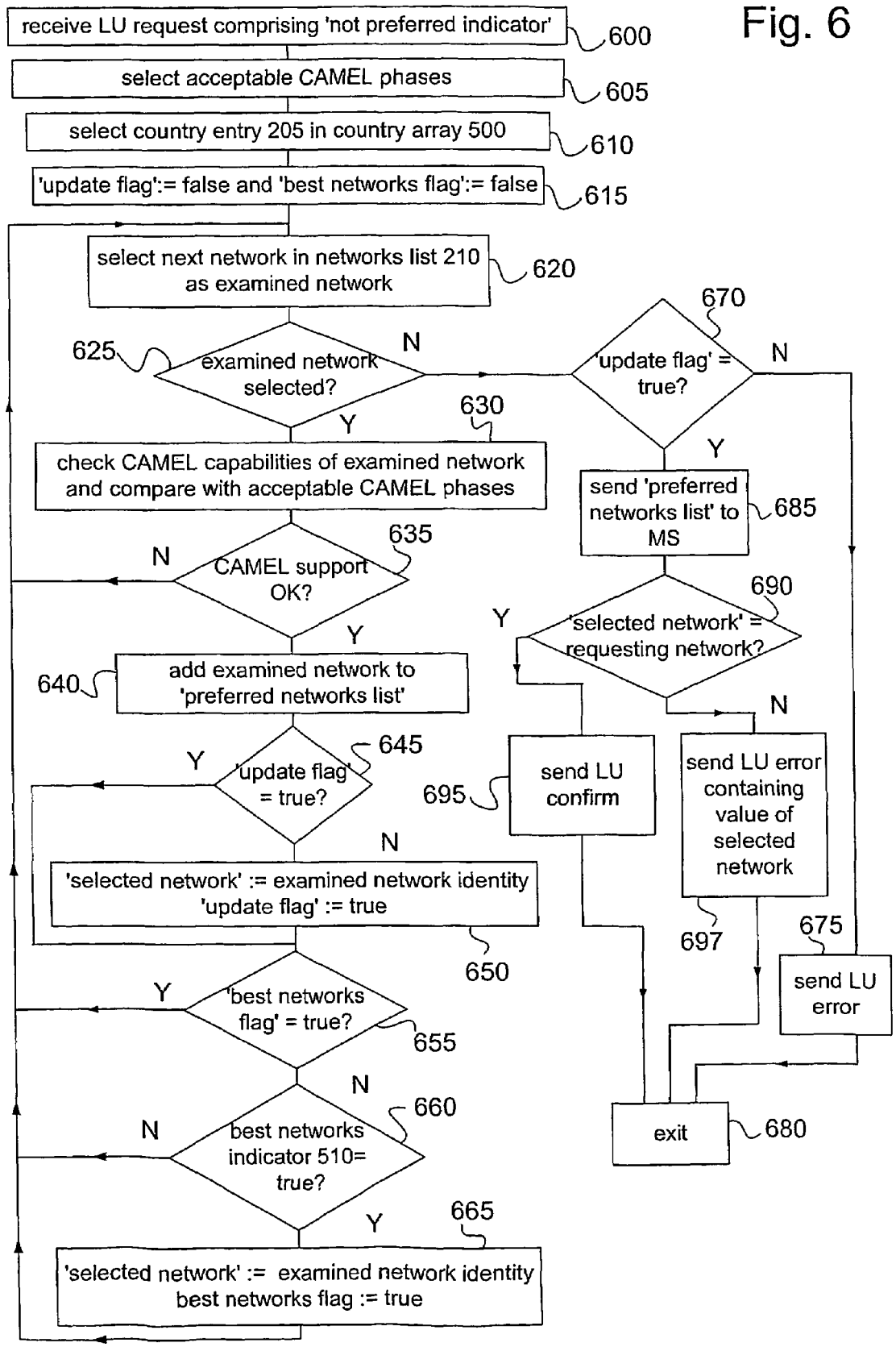
FIG. 6 is a schematic flowchart describing an embodiment of the inventive method in which the international roaming indication is included in a location update request message.

In FIG. 6, a flowchart is shown, describing an exemplary embodiment of the inventive method in which the international roaming indication is received by the home network 100 via a location update request. The example of FIG. 6 is, for the purpose of illustration only, presented in relation to the network feature known as CAMEL. However, the embodiment of the invention described in FIG. 6 could be used in relation to any network feature. In step 600, an international roaming indication is received by home network 100 in the form of a location update request sent from a MS 110 to the HLR 125, the location update request comprising a not preferred indicator as well as an identity of the network 130 to which the MS 110 is trying to register. This network 130 will in the following be referred to as the requesting network. The international roaming indication is then processed by home network 100. In step 605, the CAMEL phases which would be acceptable to the subscription of services associated with MS 110 is selected. In step 610, the country array 500 is scanned, and the country entry 205, corresponding to the identity of the requesting network, is selected (it is here assumed that the requested network is included in the country array 500). In step 615, an "update flag", indicating whether a network 130 suitable for communication has been found or not, is set to "false". Furthermore, a "best networks indication flag", indicating whether a network has been found, suitable for communication and belonging to the group of networks that the operator of home network 100 considers to be favourable over other networks, is set to "false". Step 620 is then entered, in which the first network 130 in the networks list 210 linked to the country entry 205, representing the requested network, is selected. This network will in the following be referred to as the examined network. In step 625, it is checked whether an examined network was selected in step 620. If so, step 630 is entered, where the capabilities list 215, linked to the country entry 205 representing the examined network, is checked, and the CAMEL phases supported by the examined network are compared to the CAMEL phases which are acceptable to the MS 110. In step 635, it is then checked whether the CAMEL support provided by the examined network is acceptable. If not, step 620 is re-entered, and a new examined network is selected from the networks list 210 associated with the requesting network. However, if the CAMEL support provided by the examined network is acceptable, then step 640 is entered, where the examined network is added to a preferred networks list. Step 645 is then entered, where it is checked whether the update flag is set to true. If not, then step 650 is entered, where a parameter referred to as the selected network parameter, representing the network 130 selected as the visited network, is set to the identity of the examined network, and the update flag is set to true. Step 655 is then entered. If, in step 645, it was found that the update flag was set to true, step 655 is entered directly. In step 655, it is checked whether the best networks flag is true. If not, the best networks indicator 510 associated with the examined network is checked in step 660. If the best networks indicator 510 is true, then step 665 is entered, in which the selected network parameter is set to the value of the examined network, and the best networks flag is set to true. If the value of the best networks indicator 510 is false, then step 620 is re-entered and a new examined network is selected. If, in step 655, it is found that the best networks flag is true, then step 620 is re-entered without entering step 660.

If it is found in step 625 that there are no entries in the network list 210 that have not yet been examined, then step 670 is entered. Here, it is checked whether the update flag is true, i.e. whether any network 130 has been found which would give adequate CAMEL support to MS 110. If the update flag is false, then a location update error message is sent to the MS 110 in step 675, and the procedure is ended in step 680. However, if the update flag is true, then step 685 is entered, where the preferred networks list is sent to MS 110. Step 690 is then entered, where it is checked whether the selected network parameter has the value of the identity of the requesting network. If so, then a location update confirm message is sent to the MS in step 695, confirming to MS 110 that the requesting network is a network 130 suitable for communication, and the procedure is ended in step 680. If it is found in step 690 that the selected network is not the requesting network then step 697 is entered, in which a message is sent to the MS 110 informing the MS 110 of that the requesting network is not suitable for communication, and providing the MS 110 of the identity of the selected network, with which MS 10 should try to register. This message could e.g. be a location update error message including information on the identity of the selected network. The procedure is then terminated in step 680.

FIG. 7 shows an exemplary sequence diagram describing the signalling between the MS 110, the HLR 125 and an application server 700 when the international roaming indication is included in a location update request sent from a MS 110 towards the core network. The application server 700 could be co-located with the HLR 125, or implemented elsewhere. A location update request, including a non preferred indicator, is sent from MS 110 to HLR 125, see message 7a. The reception of the location update request at the HLR 125 then triggers the sending of an international roaming request, see message 7b, comprising the identity of the MS 110 and the identity of the network 130 to which the MS 110 is trying to register. The international roaming request is then processed at the application server 700. The identity of the selected network is then returned to the HLR 125 in an international roaming result message, see message 7c, and included in a location update result message, see message 7d, sent to the MS 110. The application server 700 also sends a preferred networks list to the MS 110, see message 7e. The preferred networks list could e.g. be sent to the MS 110 by using the SMS (Short Message Service) protocol.

Instead of sending the preferred networks list to the MS 110 in a separate message, as is done in the embodiments described by FIGS. 3, 6 and 7, the preferred networks list could be included in the location update result message. Step 375 of FIG. 3, step 685 of FIG. 6, as well as message 7e of FIG. 7, would then be superfluous. Alternatively, one could choose not to send any preferred networks list at all, but only include the identity of the selected network in a location update result message.

In an embodiment where a parameter in the location update request is used as the international roaming indication, a mechanism could be introduced which informs the HLR 125 when the network feature capabilities of the visited network are altered. The HLR 125 could then send an instruction to the application server 700 to check whether the support for the network feature offered by the visited network is still acceptable. If not, the HLR 125 could decide to cancel the registration of MS 110 in the visited network. This would cause the MS 110 to try to register with the networks included in the preferred networks list stored in the MS 110. If the MS 110 is not successful in registering with any of those networks, MS 110 would search for other networks and, if a network is found, send a location update request including a not preferred indicator towards the HLR 125. In this way, it is ensured that a MS 110 is always registered with a network 130 which gives adequate support for a certain network feature, if present.

Further alterations to the procedures described by FIGS. 3 and 6 could also be made without departing from the spirit of the invention. One could e.g. introduce a step in FIGS. 3 and 6 where the size of the preferred networks list to be sent from the home network 100 to the MS 110 is checked, in order to avoid sending a preferred networks list which is too large to be stored in its entirety in the MS 110. Furthermore, one could introduce a procedure which estimates the number of countries contained in the international roaming indication, and then makes a decision on how many networks 130 operated in each country can be entered in the preferred networks list. In the procedure described in FIG. 3, a counter could be introduced that counts the number of networks 130 from each network list 210 that has been entered in the preferred networks list. Alternatively, instead of entering step 330 of FIG. 3 when step 355 has been executed for the first time, step 310 could be entered, so that only one network 130 per country entry 205 is entered into the preferred networks list. Furthermore, one could introduce links to each country entry 205 of the country array 200, the links representing neighbouring countries, and then perform the steps 330 to 365 for those neighbouring countries, in order to add networks 130 operated in the neighbouring countries to the preferred networks list. Similarly, links to country entries 205 representing adjacent networks 130 could be introduced to each country entry 205 in country array 500.

When compiling a preferred networks list, the networks 130 entered into the list could be placed in order of preference according to a predefined criterion or criteria. This could be especially interesting of no criterion is used when entering the networks 130 into the networks lists 205 of country array 200 or 500. An arranging step could then e.g. be entered between the steps 370 and 375 of FIG. 3 (steps 670 and 685 in FIG. 6), where the networks added to the preferred networks list in step 355 (step 640) could be placed in order ,according to the predefined criteria. Examples of criteria to be considered could be the level of radio coverage of the networks 130 or the ownership of the network 130. Some of the networks 130 could possibly have the same owner as home network 100, and others may be owned by operators with which home network 100 has favourable agreements.

Step 305 of FIG. 3, in which the maximum (most elaborated) and minimum (least elaborated) CAMEL level of capability that would satisfy the needs of MS 110 is selected, does not have to be performed each time an international roaming indication is received by the home network 100. The selection of maximum and minimum CAMEL level of capabilities could e.g. instead be performed upon changes to the CAMEL capabilities of home network 100, or upon changes to the subscription of services of MS 110. The results could then be stored in the home network 100 and retrieved upon the reception of an international roaming indication.

The steps 305, 340, 345, 350, 360 and 365, in which the CAMEL needs of MS 110 is compared to the CAMEL support provided by networks 130, could possibly be performed in a different way. E.g., in step 305, all the CAMEL level of capabilities which are acceptable to 110 could be stated and explicitly compared to the CAMEL level of capability provided by the networks 130.

The inventive method and apparatus described above could be used selecting a visited network with regard to more than one network feature. Each entry in the network list 210 associated with a country entry 205 in the country arrays 200 and 500, could then have one link to a capabilities list 215 for each network feature. The checks made in steps 330 to 365 of FIG. 3, and step 635 to 640 of FIG. 6, would then have to be adjusted analogously.

Furthermore, the inventive method and apparatus could be used for compiling a preferred networks list for a subscription to services without prior reception of an international roaming indication associated with the subscription. The operator of home network 100 could e.g. send preferred networks lists to its subscribers, the networks 130 included in the preferred networks lists selected on the basis of in which geographic areas subscribers to services in home network 100 most often perform international roaming as well as on the basis of the individual network feature needs of each subscription.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A mobile station for communicating in a mobile radio system, the mobile station being associated with a subscription to services in a home mobile radio network and comprising a storage for storing a list of preferred mobile radio networks, said mobile station having the capability of sending a location update request comprising a not preferred indicator to said home mobile radio network when trying to register with a mobile radio network other than the home mobile radio network or the mobile radio networks listed in the list of preferred mobile radio networks, the not preferred indicator serving to indicate that the mobile radio network with which the mobile station is presently trying to register is not one of the preferred mobile ratio networks stored on the list.

2. A method for selecting a visited mobile radio network for a mobile station performing international roaming, the mobile station being associated with a subscription to services in a home mobile radio network, in which method the need of a network feature of the subscription is considered in selecting the visited mobile radio network, said method comprising:

receiving, in the home mobile radio network, an international roaming indication associated with said subscription, the international roaming indication being a location update request comprising information on geographical region (s), an identity of the mobile station, an identity of the mobile radio network to which the mobile station is trying to register, and a not preferred indicator, the not preferred indicator serving to indicate that the mobile radio network with which the mobile station is presently trying to register is not one of the preferred mobile ratio networks stored on a list maintained by the mobile station; and selecting an acceptable visited mobile radio network including considering said information on geographical region (s) together with the network feature need of the mobile station.

3. The method according to claim 2, further comprising:

compiling a list of preferred mobile radio networks, comprising the identity of at least one mobile radio network, the at least one mobile radio network supporting said need of a network feature of the subscription;

sending said list of preferred mobile radio networks to the mobile station; and storing said list of preferred mobile radio networks at the mobile station.

4. The method according to claim 3, wherein the identities of mobile radio networks in the list of preferred mobile radio networks are placed in order of preference according to a predefined criteria.

5. The method according to claim 3, wherein the mobile station, upon failure to register with the home mobile radio network, selects a mobile radio network from said list of preferred mobile radio networks as the visited mobile radio network with which the mobile station should try to register.

6. The method according to claim 2, wherein the information on geographic region (s) consists of the identity of the mobile radio network to which the mobile station is trying to register.

7. The method according to claim 2, wherein the identity of a selected visited mobile radio network is include in a location update result message sent to the mobile station in response to receiving said location update request.

8. The method according to claim 2, wherein a set of mobile radio networks, out of which the visited mobile radio network can be selected, is arranged in an array, each away entry representing a geographic area and each mobile network in the set being associated with at least one array try representing a geographic area in which the mobile radio network is operated, each mobile radio network in the set being further associated with information on the network feature support provided by said mobile radio network.

9. The method according to claim 8, wherein the geographic area represented by an array entry corresponds a the coverage are of a mobile radio network, the mobile radio network not necessarily being included in the set of mobile radio networks; and the coverage area of each of the mobile radio networks in the set is represented by an entry in the array.

10. The method according to claim 8, wherein to each mobile radio network in the set is associated an indicator indicating whether the mobile radio network is a favourable mobile radio network; and the value of the indicator is taken into account in selecting a visited mobile radio network.

11. The method according to claim 8, wherein the mobile radio networks in the array are placed in order of preference according to a predefined criteria.

12. The method according to claim 2, wherein said network feature is the Customized Application for Mobile network Enhanced Logic (CAMEL).

13. The method according to claim 2, wherein said network feature is the General Packet Radio Service (GPRS).

14. A system for mobile radio communication comprising mobile radio networks, each mobile radio network enabling mobile radio communication for mobile stations registered with the mobile radio network, said system comprising means for taking into account the needs of a network feature of a mobile station when selecting a visited mobile radio network for said mobile station, wherein said means for taking into account comprise receiving means for receiving an international roaming indication associated with said mobile station in the form of a location update request, said international roaming indication comprising information on geographical region (s), an identity of the mobile station, an identity of the mobile radio network to which the mobile station is trying to register, and a not preferred indicator, the not preferred indicator serving to indicate that the mobile radio network with which the mobile station is presently trying to register is not one of the preferred mobile radio networks stored on a list maintained by the mobile station.

15. The system of claim 14, wherein said means for taking into account further comprises:
a first storage for storing information on which level(s) of capability of said network feature that each of the mobile radio networks in a set of mobile radio networks supports; and
a second storage for storing information on level-of-capability needs of a subscription, associated with said mobile station, with regard to said network feature.

16. The system of claim 15, said system further comprising
sending means for sending a location update result message to the mobile station, said location update result message comprising information on a visited mobile radio network with which said mobile station should try to register.

17. The system of claim 14, wherein
said means for taking into account further comprises means for compiling the list of preferred mobile radio networks, containing identities of mobile radio networks which gives support for the network feature needs of said mobile station; an sending means for sending the list of preferred mobile radio networks to the mobile station.

18. The system of claim 17, wherein
the sending means further comprises means for sending a location update result message comprising said list of preferred mobile radio networks.

19. The system of claim 14, wherein said network feature is the Customized Application for Mobile network Enhanced Logic (CAMEL).

* * * * *